Inventors
HANS REICH
GÜNTHER GÖRTZ

BY Craig & Antonelli
ATTORNEYS

Aug. 18, 1970　　　H. REICH ET AL　　　3,524,525
FRICTION RING CONSTRUCTION AND MOUNTING IN
A SYNCHRONIZING CLUTCH
Filed March 21, 1968　　　　　　　　　2 Sheets-Sheet 2
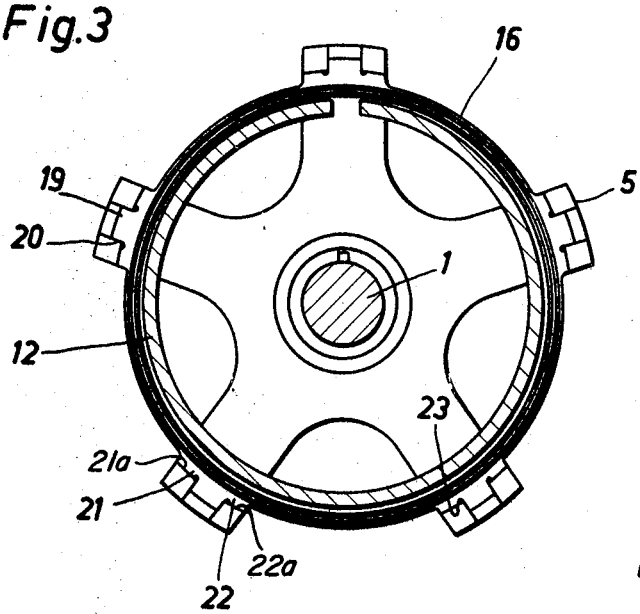
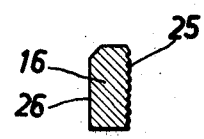
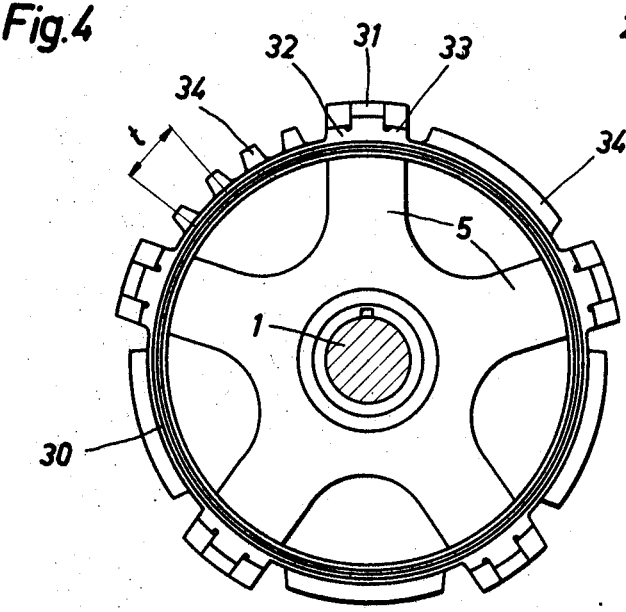
Inventors
HANS REICH
GÜNTHER GÖRTZ
By Craig & Antonelli
ATTORNEYS United States Patent Office 3,524,525
Patented Aug. 18, 1970

3,524,525
FRICTION RING CONSTRUCTION AND MOUNTING IN A SYNCHRONIZING CLUTCH
Hans Reich, Tamm, Wurttemberg, and Günther Görtz, Siedlung, Germany, assignors to Dr.-Ing. h.c.F. Porsche KG, Stuttgart-Zuffenhausen, Germany
Filed Mar. 21, 1968, Ser. No. 715,099
Claims priority, application Germany, Mar. 21, 1967, 1,630,912
Int. Cl. F16d 23/06
U.S. Cl. 192—53                                    6 Claims

ABSTRACT OF THE DISCLOSURE

A synchronizing clutch employing a friction ring that is frictionally engaged by a split ring resiliently compressed by the depending teeth of the shifting sleeve, which shifting sleeve is carried by support arms provided with slots receiving projections on the friction ring; wear of the friction ring is decreased by centering of the friction ring through radially abutting surfaces on the support arms and friction ring. Reliable entrainment of the friction ring is obtained by providing it with teeth corresponding to and for engagement with the teeth of the shifting sleeve. Uniform operation is obtained with grooves provided on the friction surface of the friction ring.

BACKGROUND OF THE INVENTION

Synchronizing clutches have been provided for motor vehicles, which include a resilient split synchronizing ring engageable with the teeth of the shifting sleeve for moving a friction ring into engagement to accomplish synchronization of the clutch member speeds. Excellent results are obtained with respect to the required synchronization during shifting with a compact construction. However, the friction ring tends to produce considerable noise and additionally there occurs nonuniform operation or wear and tear pattern on the friction surface of the friction ring. Essentially, the cause of the noise and nonuniformity is that the friction ring is operating with elements of different materials and is relatively free to move in the radial direction. A prior art device of this type is shown in U.S. Pat. No. 3,347,347, filed on Feb. 14, 1966, which disclosure is incorporated in its entirety in this application by reference.

SUMMARY OF THE INVENTION

With the present invention, the above-mentioned disadvantages are avoided in that the friction ring is centered on both sides of its lugs that engage within slots provided in the guide arms of the shifting sleeve support, in the radial direction, by projections provided on the inner surface of the guide arms. Thereby, it is avoided that the friction ring rests on the synchronizing ring or the clutch body in the disengaged position of the synchronizing clutch. With the present construction, the friction ring rotates freely together with the shifting sleeve support and cannot form a source of noise. The friction ring may be provided with a plurality of clutch teeth between the portions in engagement with the guide arms to accomplish a reliable entrainment during the clutching operation; the pitch of these teeth corresponding to the pitch of the shifting sleeve and the pitch of the cooperating clutch body of the gear to be shifted. Exact guidance of the friction ring is further assured when the radially outwardly extending lugs fit without play into the corresponding recesses of the guide arms of the shifting sleeve support. A uniform running or operation of the friction ring is obtained by providing its friction surface, which faces the corresponding friction surface of the cooperating clutch body, with a grooved profile to diminish its effective friction surface and by constructing the opposite friction surface associated with the synchronizing ring as a planar surface. In this manner, the different friction relationships for the friction ring between the hardened clutch body and the tempered synchronizing ring are equalized.

BRIEF DESCRIPTION OF THE DRAWING

Further objects, features and advantages of the present invention will become more clear from the following detailed description of the drawing, wherein:

FIG. 3 is a cross-sectional view through the synchronizing clutch taken along line III–III of FIG. 1, with omission of the shifting sleeve and cooperating clutch body;

FIG. 4 is a cross-sectional view through the sychronizing clutch taken along line IV–IV of FIG. 1, with omission of the shifting sleeve and cooperating clutch member; and FIG. 5 is a cross-sectional view through the friction ring according to FIG. 2, on an enlarged scale.

DETAILED DESCRIPTION OF THE DRAWING

Figure 1:
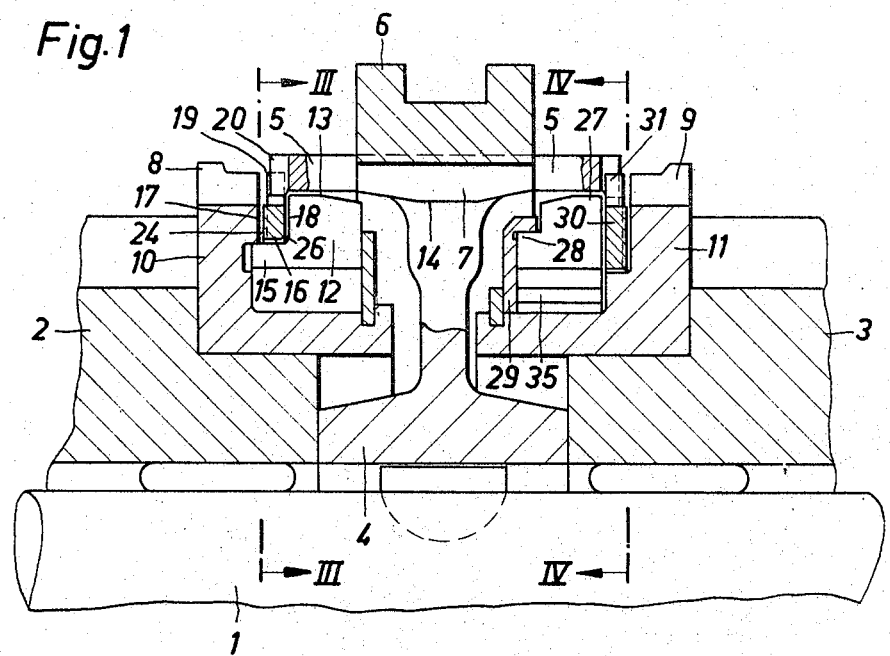
FIG. 1 is a central longitudinal partial cross sectional view taken through a portion of the synchronizing clutch for motor vehicles, including the split resilient synchronizing rings and the centering of differently constructed friction rings according to the present invention.
Figure 2:
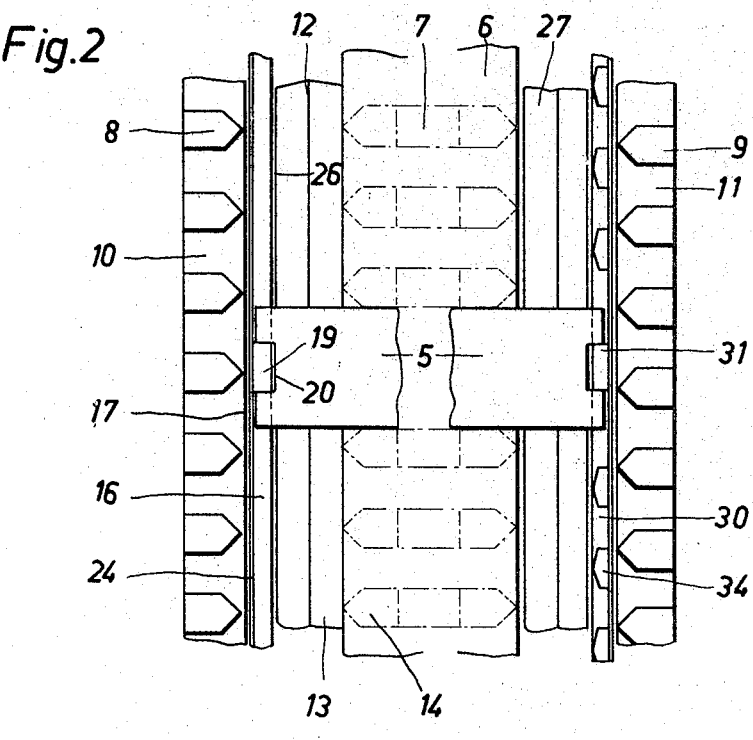
FIG. 2 is a development of the synchronizing components according to FIG. 1.

In FIG. 1, there is shown a multiple clutch provided with a single shifting sleeve provided, for example, for a change speed transmission of an automotive vehicle. A transmission shaft 1 rotatably supports gears 2, 3 in such a manner that they are not displaceable in the longitudinal direction, that is, the axial direction of the shaft 1. Gears 2 and 3 are in constant engagement with corresponding gears mounted on a counter transmission shaft (not shown in the drawing). A shifting sleeve support 4 is keyed for rotation with the transmission shaft 1. The shifting sleeve support 4 is provided with a plurality of radially extending, for example 5 as shown in FIG. 3, guide arms that are uniformly spaced about its circumference, each arm 5 being substantially T-shaped as viewed in the cross section of FIG. 1. The outermost surfaces of the guide arms 5 are received within axially extending downwardly opening channels in the inner surface of a shifting sleeve 6 for slidably supporting the shifting sleeve 6, which shifting sleeve 6 is axially movable. Between the just mentioned downwardly opening channels, which correspond in number to the guide arms 5, the shifting sleeve 6 is provided with a plurality of uniformly spaced clutch teeth 7 that are interengaged with corresponding clutch teeth 8 or 9 of the clutch bodies 10 and 11, which are integrally connected with gears 2 and 3, at the completion of the shifting process.

The clutch body 10 is provided with a hub portion surrounded by a split resilient synchronizing ring 12. The synchronizing ring 12 has a conically shaped wedging surface 13 for engagement with the correspondingly shaped wedging surfaces 14 of the clutch teeth 7 on the shifting sleeve 6, which engagement is accomplished by axially moving the shifting sleeve 6 to the left as viewed in FIG. 1. The synchronizing ring 12 is axially centered by means of its annular collar 15 that is received within a correspondingly shaped annular recess of the clutch body 10. A friction ring 16 is mounted between the synchronizing ring 12 and the clutch body 10. The friction ring 16 consists of a bronze alloy and operatively cooperates with a friction surface 17 on the clutch body 10 and a friction surface 18 on the synchronizing ring 12, which surface 18 is arranged parallel thereto. The friction ring 16 is provided with five radially outwardly extending lugs 19, which corresponds to the number of guide arms 5, which lugs 19 are fitted without clearance or play into correspondingly shaped recesses or radially extending inwardly opening slots 20 of the guide arms 5. Projections 21, 22 are arranged on both sides of each of the lugs 19 at the circumference of the friction ring 16, which projections have radially outwardly facing surfaces 21a, 22a, respectively, which radially engage the radially inwardly facing curved surfaces 23 of the guide arms 5 to hold the friction ring 16 centrally with respect to the axis of rotation. Therefore, the radially outwardly facing surfaces 21a, 22a of the projections 21, 22, respectively and the radially inwardly facing surfaces 23 constitute circumferentially spaced radially facing surfaces, which extend in opposite circumferential directions from the lugs 19, for centering the friction ring 16 with respect to the axis of rotation. Surface 24 of the friction ring 16 that cooperates with the friction surface 17 of the clutch body 10 is provided with a grooved contour 25 and the opposite friction surface 26 of the friction ring 16 which operatively cooperates with the friction surface 18 of the synchronizing ring 12 is planar in construction, as shown in FIG. 5.

The operation of the left-hand synchronizing clutch of FIG. 1 commences with shifting of the shifting sleeve 6 to the left with engagement of the wedging surfaces 14 with the wedging surface 13 to move the synchronizing ring 12 axially to the left to provide for frictional engagement between the friction ring 16 and the clutch body 10 to equalize the speed of the two. Thereafter, the shifting sleeve 6 moves further to the left to engage the clutch teeth 7 and 8, which are now traveling at relatively the same speed.

Corresponding numerals have been used for corresponding parts in the synchronizing clutch shown in the right-hand portion of FIG. 1. The synchronizing ring 27 is provided with an annular collar 28 that is received within an annular centering flanged disk 29. The synchronizing ring 27 operates in much the same manner as the synchronizing ring 12 to move the friction ring 30 into frictional engagement with the clutch body 11. Friction ring 30 is provided with radially outwardly extending lugs 31, which are similar to the lugs 19 of friction ring 16, which lugs 31 engage in corresponding slots or recesses provided in the guide arms 5. Centering of the friction ring 30 is accomplished by means of projections 32, 33 on the circumference of the friction ring in a manner similar to centering of the friction ring 16 previously described. Between projection 32, 33, the friction ring 30 is provided with a plurality of clutch teeth 34 corresponding in shape and pitch to the clutch teeth 9 of the clutch body 11 and clutch teeth 7 of the shifting sleeve 6. The clutch teeth 34 serve to guide the clutch teeth 7 of the shifting sleeve 6 in such a manner so that a slight rotation of the clutch body 11 with respect to the synchronizing ring 27 in ensured and reliable entrainment of the friction ring 30 is obtained. In addition, means can be arranged between the synchronizing rings 12 and 27, which increase the servo-action thereof. Operation of the right-hand synchronizing clutch corresponds to operation of the left-hand synchronizing clutch.

The foregoing embodiment has been shown and described in detail only for purposes of illustration; further variations, modifications and embodiments are contemplated within the spirit and scope of the present invention.

We claim:

1. A synchronizing clutch for two relatively rotatable members employing a resilient split synchronizing ring engageable by the clutch teeth of a shifting sleeve carried by guide arms of one member to place a friction ring, circumferentially drivingly connected with the guide arms by means of lugs, into friction surfaces engagement with the other member, the improvement comprising: means for centering the friction ring with respect to the axis of rotation including circumferentially spaced radially facing surfaces extending in opposed circumferential directions from each of said lugs and in engagement on the friction ring and the guide arms.

2. The clutch according to claim 1, wherein said lugs are radially outwardly extending circumferentially spaced lugs and said guide arms have radially extending inwardly opening slots receiving therein said lugs to form the driving connection therebetween; said friction ring having radially outwardly facing surfaces of rotation on each circumferential side of each of said lugs and said guide arms having radially outwardly facing surfaces of rotation in engagement with said surfaces of rotation of said friction ring constituting the radially facing surfaces.

3. The clutch according to claim 2, wherein said lugs and slots engage without circumferential play.

4. The clutch according to claim 2, wherein the friction surface of said friction ring that engages the corresponding friction surface of the other member during shifting is provided with a plurality of grooves to diminish its effective friction surface; and the opposite friction surface of said friction ring that engages the corresponding friction surface of the synchronizing ring during shifting is planar.

5. The clutch according to claim 2, wherein said friction ring is provided along its outer periphery with circumferentially spaced clutch teeth between adjacent lugs complementary to the clutch teeth of the shifting sleeve and the other member.

6. The clutch according to claim 5, wherein said lugs and slots engage without circumferential play.

References Cited

UNITED STATES PATENTS 3,347,347  10/1967  Hetmann.

MARK M. NEWMAN, Primary Examiner

A. O. HERRMANN, Assistant Examiner